No. 730,193. PATENTED JUNE 2, 1903.
W. F. PARKER.
BICYCLE TRAILER PACKAGE CARRIER.
APPLICATION FILED MAY 6, 1902.
NO MODEL. 2 SHEETS—SHEET 1.
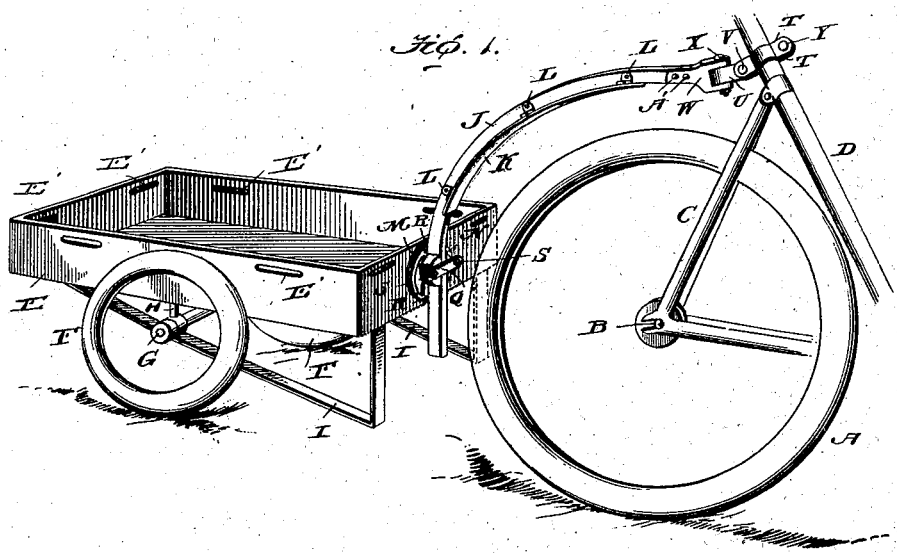
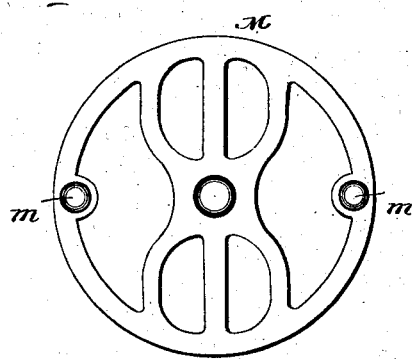
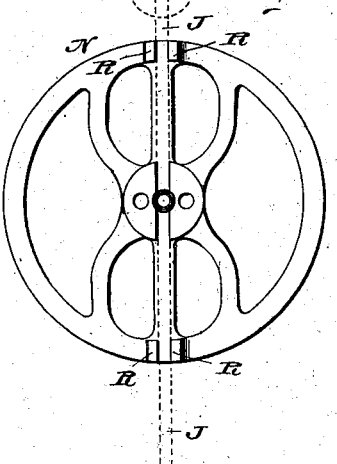
Witnesses
Wm. Fremont Parker
Inventor No. 730,193. PATENTED JUNE 2, 1903.
W. F. PARKER.
BICYCLE TRAILER PACKAGE CARRIER.
APPLICATION FILED MAY 6, 1902.
NO MODEL. 2 SHEETS—SHEET 2.
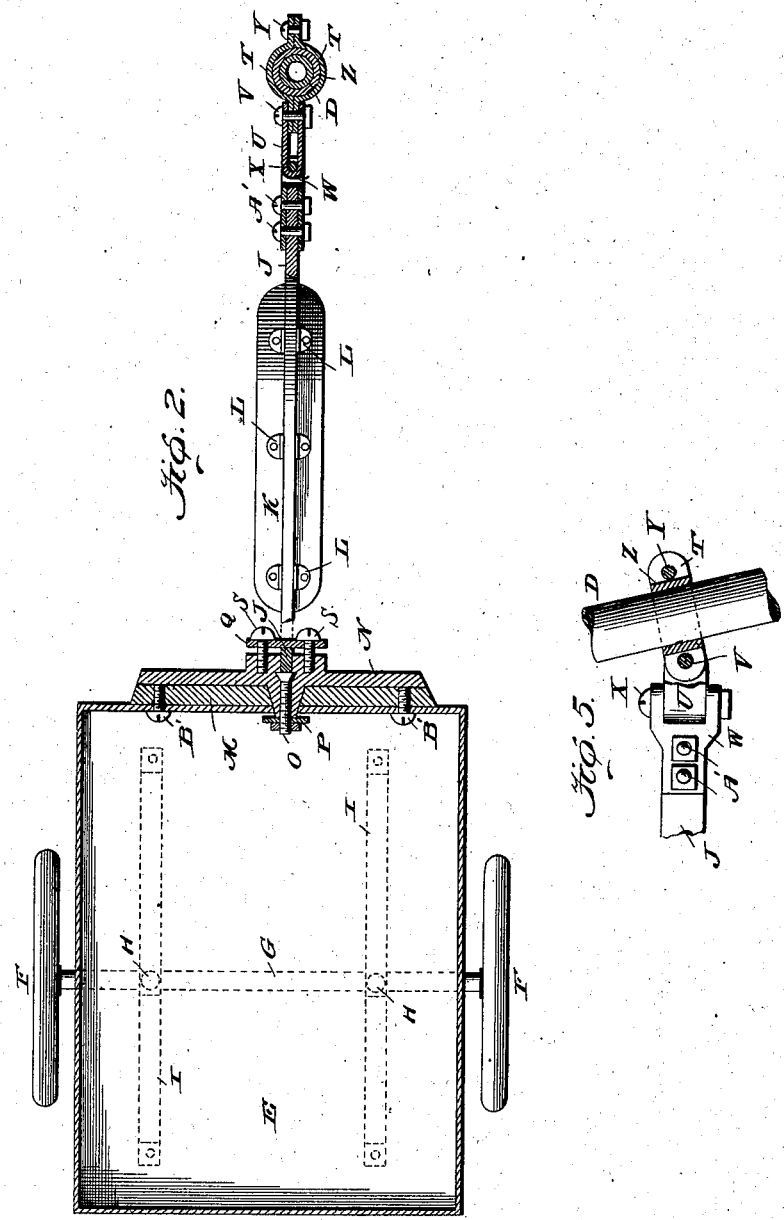
Wm. Fremont Parker
Inventor
Witnesses No. 730,193. Patented June 2, 1903.

UNITED STATES PATENT OFFICE.

WILLIAM FREMONT PARKER, OF WASHINGTON, DISTRICT OF COLUMBIA.

BICYCLE TRAILER PACKAGE-CARRIER.

SPECIFICATION forming part of Letters Patent No. 730,193, dated June 2, 1903.

Application filed May 6, 1902. Serial No. 106,221. (No model.)

*To all whom it may concern:*

Be it known that I, WILLIAM FREMONT PARKER, a citizen of the United States, residing in Washington, in the District of Columbia, have invented certain new and useful Improvements in Bicycle Trailer Package-Carriers, of which the following is a specification.

My invention relates to that class of devices wherein a wheeled vehicle is attached to a bicycle for the purpose of carrying packages, mail-pouches, &c.; and it consists of the features hereinafter described, and more particularly set forth in the claims.

In the accompanying drawings, forming a part of this specification, Figure 1 is a perspective of the rear portion of a bicycle, showing an attachment of my invention thereto. Fig. 2 is a cross-section top view of my invention, the running-gear being shown by dotted lines. Fig. 3 is a front elevation of the inner connecting-plate. Fig. 4 is the same of the outer connecting-plate, and Fig. 5 is a detail view showing the form of connection between the forward end of the handle and seat-post.

In the drawings, A represents the hind wheel of a bicycle.

B is the axle, upon which the wheel revolves.

C is the standard-fork, which connects with the axle, and D is the seat-standard, to which the upper end of fork C is secured.

E is the box, made, preferably, with metal sides and wooden bottom, mounted upon two wheels F F, which revolve on axles G, having standards H H extending to the box.

I I represent metal strips which are secured to the rear end of box E, then connect with the axle G and extend forward and downward to the front end of the box, and are then bent upward, so as to connect with the front end of the box. The object of these metal strips is to brace the box and axle together and also to form legs at the front to hold the box in an upright position.

J represents a handle-bar bent in the arc of a circle, so as to have its lower end in a vertical position and its upper end in substantially a horizontal position. K is a mud-shield, secured to the said handle-bar by clips L or other similar fastenings. The lower end of the handle-bar is connected with the front end of the box E by two circular plates M and N. The plate M is secured to the box E by bolts or rivets B' B', passing through the perforations m m. The plate N is adapted to be adjusted upon the plate M and is held in place by a bolt O, having a washer and nut P on the inside of the box E, and is so arranged that the washer P will bind upon the plate N and is free to turn on the inside of the box E. The handle-bar J is held in place upon the plate N by means of a cross-bar Q, which is secured to the plate N by screws S S, so that the handle-bar J may be readily adjusted up and down upon the plate N, and it is held from twisting by means of lugs R R, formed upon the circumference of the plate N, so as to securely hold the bar J between them.

T represents two metal clamps bent semi-circular in their central parts to fit the seat-standard D. They are secured together by bolts V and Y, passing through perforations in said plates.

U represents a clevis-shaped metal strap having perforations in its open end and adapted to embrace the rear ends of the metal clamps T and be pivotally secured thereto by bolt V, passing through the perforations in said parts. W represents another clevis-shaped strap having its open ends embracing the front end of the handle-bar J and being riveted thereto by rivets A'. The central portion of the strap W is cut away so as to admit the central portion of strap U, and a removable pin X is inserted, so as to hold the two straps together.

Z represents one or more rubber or leather strips found necessary to fasten clamps T solidly to the bicycle seat-standard and to protect the same from injury by said metal clamps.

It will be seen that the connection between the straps U and W will permit the rear end of the handle-bar J swinging laterally to either side, while the connection between the strap U and the clamp T will permit of the rear end of the handle-bar being raised or lowered, so as to accommodate the bicycle trailer package-carrier and the bicycle to which it is attached to any unevenness in the ground. The attachment of the rear end of the handle-bar to the front end of the box E being adjustable the handle-bar J can be readily adjusted up or down, so that the front end can be adjusted to fit bicycles of different heights. While the bicycle retains its upright position, the handle-bar J will also be held in an upright position; but should the bicycle be tilted to one side or the other the rotary movement of the outer plate N, to which the handle-bar is attached, will permit it to follow the bicycle in any tilting movement, even should it lie flat upon the ground, and the box E, comprising the parcel-carriers, will rest upon its legs I and still retain its upright position. The handle-bar J should be adjusted upon the front end of box E, so that while the bicycle retains its upright position the legs I will be held several inches above the ground; but should the bicycle tip considerably to the side then the legs I will drop to the ground and hold the box E in an upright position.

Having thus described my invention, what I claim is—

1. In a bicycle trailer package-carrier, a coupling-bar having a rotary connection with said carrier at its lower end and its upper end being adapted to be jointedly secured to the seat-standard of a bicycle so as to permit lateral motion of its rear end.

2. In a bicycle trailer package-carrier a coupling-bar having a rotary connection with said carrier at its lower end and its upper end being adapted to be jointedly secured to the seat-standard of a bicycle so as to permit vertical motion of its rear end.

WILLIAM FREMONT PARKER.

Witnesses:
    E. H. BOND,
    WM. C. DASHIEL.